1

2,924,621

PROCESS FOR THE MANUFACTURE OF MONOHYDROXY POLYETHERS

Wilhelm Krey and Karl Raichle, Krefeld-Uerdingen, Germany, assignors to Farbenfabriken Bayer Aktiengesellschaft, Leverkusen, Germany, a corporation of Germany No Drawing. Application June 25, 1957
Serial No. 667,982

Claims priority, application Germany June 30, 1956

16 Claims. (Cl. 260—611)

If one of the three alcoholic hydroxyl groups of trihydric alcohols such as trimethylol ethane or propane is etherified in known manner with an organic monohalide, the halide atom of which being aliphatically bound and reactive, in the presence of alkali metal hydroxide, such as lithium, sodium or potassium hydroxide, by using 1 mol of halide and 1 mol of hydroxide per 1 mol of trihydric alcohol, a mixture of monoether, diether and unchanged trihydric alcohol is obtained. Accordingly, it was to be expected that with the use of 2 mols of halide and of hydroxide per 1 mol of alcohol, there should be obtained in addition to the diether also the monoether and triether and possibly also unchanged trihydric alcohol.

Surprisingly, it has now been found that even with the use of more than 2 mols of halide and the corresponding quantities of hydroxide per 1 mol of trihydric alcohol, monoether and triether are practically not formed. In fact, technically valuable diethers are thus obtained in a good yield which are practically free from monoethers and triethers.

Furthermore, it has been found that when reacting 1 mol of a dihydroxy monoether of a trihydric alcohol of the class mentioned above with at least 1 mol of halide and hydroxide, there is also obtained the corresponding monohydroxy diether.

That is to say: when reacting trihydric alcohols of the group described above with more than one equivalent of halide and hydroxide the third hydroxyl group of the polyalcohol is not etherified.

However, the process according to the present invention is not limited to the use of trihydric alcohols such as trimethylol ethane or propane. Instead, all polyhydric alcohols may be used. These are obtainable, as is known in the art, by reacting an aldehyde or ketone with formaldehyde, that is to say for instance the condensation product of formaldehyde:

With acetaldehyde→pentaerythritol
With propionaldehyde→trimethylolethane
With butyraldehyde→trimethylolpropane
With valeraldehyde→trimethylolbutane
With phenylacetaldehyde→trimethylolphenylmethane
With acetone→3,3,3-trimethylolisopropanol
With methylethylketone→3,3-dimethylolbutanol-2
With acetophenone→2,2,2-trimethylol-1-phenylethanol
With phenylethylketone→2,2-dimethylol-1-phenylpropanol Furthermore, mono- and diethers of such polyhydric alcohols may be used under the condition that at least two hydroxyl groups of those etheralcohols are still free. Examples of such etheralcohols are: mono- and diethers of pentaerythritol, of 3,3,3-trimethylol-isopropanol-2 and of 2,2,2-trimethylol-1-phenylethanol, and monoethers of trimethylolethane, propane, butane, of trimethylolphenylmethane, of 3,3-dimethylolbutanol-2 and of 2,2-dimethylol-1-phenylpropane.

Thus, the present invention relates to a process for the manufacture of monohydroxy polyethers derived from polyhydric alcohols having at least 3 methylol groups, alkylmethylol groups and arylmethylol groups respectively on 1 carbon atom by reacting the polyhydric alcohol with an organic monohalide, the halide atom of which is aliphatically bound and reactive, and an alkali metal hydroxide, the reaction mixture including 1 mol of such a polyhydric alcohol with 4 to 2 free hydroxyl groups and at least 3 to 1 mols of halide and of hydroxide, at a temperature range from about room temperature to about 200° C.

Since the present process is based, as mentioned above, on the knowledge that monohydroxy polyethers are preferably formed from the aforesaid polyhydric alcohols, it is also possible to produce mixed monohydroxy polyethers according to the present process. Thus, for example, the allylbenzyl ether may be obtained from the monoallyl ether of trimethylolpropane by the action of at least 1 mol of benzyl chloride with the addition of an equivalent quantity of an alkali metal hydroxide.

As organic monohalides there may be used, as in the process known in the art, all monohalides the halide atom of which is aliphatically bound and reactive. The halide atom may be mainly in practice the chlorine, although the bromine and the iodine may also be employed.

As examples of suitable halides there may be mentioned: methyl, ethyl, propyl, isopropyl, n-butyl, isobutyl, chloride, bromide and iodide, the pentyl, the hexyl chlorides, bromides and iodides, the allyl, the methallyl, the crotyl, the pentenyl, the hexenyl chlorides, bromides and iodides, the cyclopentyl, the cyclohexyl, the cyclopentenyl, the cyclohexenyl chlorides, bromides, and iodides, the benzyl chloride and bromide, the phenyl ethyl and the phenyl benzyl chloride and bromide the chloro- and bromomethyl naphthalenes.

As mentioned above the reaction temperature ranges from about room temperature to about 200° C. and especially from about 50 to about 150° C. and depends on the reactivity of the halogen compound.

In many cases the reaction may be carried out at atmospheric pressure although slightly reduced or elevated pressure also may be used. Particularly when a halide is used which is volatile at relatively low temperatures, it is preferable to work at increased pressure.

In some cases, the reaction is promoted or only made possible by the use of solvents. The polyetheralcohols obtained are themselves outstandingly suitable as solvents. They do not participate in the reaction owing to the inertia of their free alcohol group in this process. It is therefore advantageous to use as solvent the polyether to be produced, i.e., for example the trimethylolpropane-diallyl ether if the same is intended to be produced.

As solvent, there may also be used with advantage a higher or lower boiling polyether (in order to promote the separation in the fractional distillation), for example trimethylolpropane-dibenzyl ether in the production of trimethylolpropane-dibutyl ether.

The monohydroxy polyethers obtainable according to the invention are valuable solvents for a great number of organic compounds thus for preparing lacquer compositions. They may further be used as intermediates for organic syntheses, e.g. for producing or modifying polyesters by methods well known per se in the art.

The following examples are given for the purpose of illustrating the invention.

*Example 1*

In a vessel provided with stirrer, heating and cooling arrangement, 1340 parts by weight (10 mols) of trimethylolpropane are heated to 60–70° C. For production of the diallyl ether, there are required when using a 10 percent excess of the reagents: 1670 parts by weight of allyl chloride and 880 parts by weight of sodium hydroxide. Since the reaction mixture would solidify by the addition of the whole amount of sodium hydroxide, only 220 parts by weight of sodium hydroxide are initially added to the alcohol and the mixture is stirred at 60–70° C. for about 1 hour until the alcoholate is formed. Subsequently, 417.5 parts by weight of allyl chloride are likewise introduced at 60–70° C. as and when it is consumed. The process may be carried out in an open vessel under reflux or the allyl chloride may be forced into a closed vessel, involving a pressure of about 0.1 to 1 atmosphere. The procedure is repeated three times until the total quantity of sodium hydroxide and of allyl chloride has reacted. Stirring is continued at 60–70° C. for a further 1–2 hours, the mixture is neutralised with a little acid (mineral acid or acetic acid), washed with 2500 parts by weight of water in order to remove the salts and the impure product thus obtained is fractionated. By distillation under normal pressure, 150 parts by weight of allyl chloride are recovered. The remaining part is distilled in vacuo yielding 200 parts by weight of monohydroxy diallyl ether from trimethylolpropane (B.P. about 95 to 105° C./2–5 mms. mercury gauge). The hydroxyl value lies at 260–270 (theoretical value 262).

It is more convenient to carry out the reaction by adding as solvent 600 parts by weight of trimethylolpropane-diallyl ether to the composition. The whole quantity of sodium hydroxide may then be added in one portion; the allyl chloride is likewise introduced in one portion as and when it is consumed. The working up is not changed and the yield remains the same.

The sodium hydroxide may be replaced by the equivalent amount of concentrated sodium hydroxide solution.

*Example 2*

If the 1670 parts by weight of allyl chloride are replaced in Example 1 by 2640 parts by weight of allyl bromide, the same yield of monohydroxy diallyl ether is obtained by the same working method.

*Example 3*

In a 3 litres-pressure vessel made of chromium nickel steel and provided with a good stirrer, there are heated to 150° C. for 4 hours, 402 grams of trimethylolpropane (3 mols), 400 grams of trimethylolpropane-dibenzyl ether as solvent, 290 grams of sodium hydroxide (6 mols+20 percent excess) and 665 grams of n-butyl chloride (6 mols+20 percent excess). Upon cooling, the mixture is neutralised with a small quantity of hydrochloric acid and the sodium chloride which separates out is filtered off. By fractionating the solution in vacuo, about 400 grams of monohydroxy trimethylolpropane-dibutyl ether, B.P. 120–140° C./1–2 mms. mercury gauge, are obtained. The dibenzyl ether remains in the residue and may be recovered in a pure state by distillation.

*Example 4*

360 parts by weight of trimethylolethane, B.P. 190° C. (3 mols), are reacted with vigorous stirring at 70–100° C. under reflux in the presence of 300 parts by weight of trimethylolethane-diallyl ether, with 300 parts by weight of sodium hydroxide (6 mols+20 percent excess) and 576 parts by weight of allyl chloride (6 mols+20 percent excess). The mixture is treated with water in order to dissolve the precipitated sodium chloride and the aqueous solution is then separated. By fractional distillation, there are obtained (after removing the diallyl ether used as solvent) 560 grams of monohydroxy trimethylolethane-diallyl ether of B.P. 95–105° C./2–5 mms. mercury gauge. Hydroxyl value 290–295 (theoretically 280).

*Example 5*

If 405 parts by weight of trimethylolpropane (3 mols) are reacted in a similar manner to that described in Example 4, with 275 parts by weight of sodium hydroxide (6 mols+10 percent excess) and 600 parts by weight of methallyl chloride (6 mols+10 percent excess) in the presence of 200 parts by weight of trimethylolpropane-dibenzyl ether, there is obtained after washing out the sodium chloride with water an oil which yields upon fractionating about 520 parts by weight of monohydroxy trimethylolpropane-dimethallyl ether of B.P. 102–105° C./0.2 mm. mercury gauge. The dibenzyl ether remaining in the residue is recovered unchanged by distillation.

*Example 6*

698 parts by weight of dihydroxy trimethylolpropane-monoallyl ether (4 mols), prepared from trimethylolpropane and allyl chloride in the presence of sodium hydroxide solution and purified by fractional distillation of the raw ether mixture, are stirred at 80–100° C. with 200 parts by weight of 97 percent sodium hydroxide (4.2 mols). At the same temperature, 600 parts by weight of benzyl chloride (4.2 mols) are added dropwise. When the strongly exothermic reaction has subsided, the precipitated sodium chloride is dissolved by the addition of 1000 parts by weight of water and the aqueous layer is separated. By distilling the raw product, 860 parts by weight (82 percent of the theoretical) of the mixed monohydroxy diether having a hydroxyl value 220 to 240 (theoretical value 212) are obtained.

*Example 7*

To a mixture of 272 grams of pentaerythritol (2 mols) and 747 grams of a 45 percent caustic soda solution (6 mols+96 grams excess) there are added at 80–100° C. under stirring 641 grams of allyl chloride (6 mols + 182 grams excess) in such an extent as the allyl chloride reacts. The process takes 6–8 hours. Then xylene is added to the reaction mixture and the water is distilled off azeotropically. From the residue the sodium chloride is filtered off and the filtrate fractionated under reduced pressure. Firstly the excess of allyl chloride and the xylene distil off. 470 grams of the raw polyether then are fractionated as follows:

329 grams=70 percent of monohydroxy triallyl ether (B.P. 126–130° C./1–2 mms. mercury gauge)
118 grams=25 percent of dihydroxy diallyl ether (B.P. 139–144° C./1–2 mms. mercury gauge)
5 grams=1 percent of trihydroxy monoallyl ether (B.P. 163–170° C./1–2 mms. mercury gauge)
15 grams=3 percent of residue.

When using about 100–400 grams of the monohydroxy pentaerythritol triallyl ether (pure or in mixture with di- and monoether) as solvent the caustic soda may be used free from water as a powder and the reaction time is reduced to about the half. Furthermore the working up is simplified because practically no water is to be removed.

*Example 8*

To a solution of 226 grams (1 mol) of trihydroxy pentaerythritol monobenzyl ether (B.P. 190° C./0.4 mm. mercury gauge) in 300 grams of monohydroxy trimethylolpropane diallyl ether 96 grams of caustic soda (2 mols +16 grams excess) and 183 grams of allyl chloride (2 mols+31 grams excess) are added at 60–80° C. under stirring. When all allyl chloride is added, that is after about 1–2 hours, the stirring is continued for a further hour at 60–80° C. Then the mixture is neutralised by hydrochloric acid and washed with water. The organic layer is separated and fractionated. One obtains at atmospheric pressure 20 grams of unreacted allyl chloride and under reduced pressure firstly the monohydroxy trimethylol propane diallyl ether. At 180–185° C. and 3 mms. mercury gauge 270–280 grams of monohydroxy pentaerythritol monobenzyl diallyl ether distil off. The hydroxyl number of the product is 188–189 (theoretical value 186).

Example 9

To 430 grams (2 mols) of dihydroxy pentaerythritol diallyl ether obtained according to Example 7 as by-product, there are added 96 grams of pulverized caustic soda (2 mols+16 grams excess). The mixture is heated to 60–90° C. under stirring and treated with 302 grams of benzyl chloride (2 mols+50 grams excess) during 3–4 hours drop by drop. The stirring is continued for another hour at the same temperature. Then the residue of sodium chloride is filtered off, the filtrate is washed with water and fractionated. From 630 grams of the raw product 560 grams of monohydroxy pentaerythritol monobenzyl diallyl ether, identical with the product of Example 9, are obtained. Residue 50 grams.

Example 10

To a solution of 134 grams (1 mol) of 3,3-dimethylolbutanol-2 in 60 grams of monohydroxy pentaerythritoltriallyl ether 132 grams (3.3 mols) of caustic soda are added with stirring. Heated at 100° C. 252 grams (3.3 mols) of allyl chloride are added dropwise under reflux in such an extent that the reaction temperature does not descend 80° C. When all allyl chloride is added the stirring is continued for 7 hours at 80° C. Then the mixture is neutralised with hydrochloric acid, and after the addition of 500 ccm. of toluene the water is distilled off azeotropically. After filtering off the residue of sodium chloride the excess of allyl chloride and the toluene are regained by distillation. By fractionating the residue under reduced pressure 191 grams of monohydroxy 3,3-dimethylol-butanol-2-diallyl ether with a B.P. of 103° C. at 3 mms. mercury gauge are obtained according to 89 percent of the theory. At last 59 grams of unreacted pentaerythritol-triallyl ether (solvent) are distilled off at 136° C. and 3 mms. mercury gauge.

We claim:

1. Monohydroxy polyethers derived from polyhydric alcohols selected from the group consisting of 1,1,1-trimethylolpropane, 1,1,1-trimethylolbutane, trimethylolphenylmethane, 3,3-dimethylolbutanol-2, 2,2-dimethylol-1-phenyl-propanol, 3,3,3-trimethylol-isopropanol and 2,2,2-trimethylol-1-phenyl-ethanol, at least 2 and up to 3 of hydroxyl groups of said polyhydric alcohols being etherified with monohydric alcohols selected from the group consisting of the allyl, the methallyl, the crotyl, the β,γ-pentenyl, the β,γ-hexenyl, the β,γ-cyclopentenyl, and the β,γ-cyclohexenyl, the benzyl and the phenyl-benzyl-alcohol.

2. Monohydroxy polyethers according to claim 1 wherein the polyether is derived from trimethylolpropane.

3. Monohydroxy 3,3-dimethylol-butanol-2-diallyl ether.

4. Monohydroxy pentaerythritol-monobenzyl-diallyl ether.

5. Monohydroxy trimethylolethane-diallyl ether.

6. Monohydroxy trimethylolpropane-diallyl ether.

7. Monohydroxy trimethylolpropane-dimethallyl ether.

8. Monohydroxy trimethylolpropane-dibenzyl ether.

9. Monohydroxy trimethylolpropane-monoallyl-monobenzyl ether.

10. Monohydroxy pentaerythritol-triallyl ether.

11. The process of producing monohydroxy polyethers which comprises reacting a polyhydric alcohol selected from the group consisting of 1,1,1-trimethylolpropane, 1,1,1-trimethylolbutane, trimethylolphenylmethane, 3,3-dimethylolbutanol-2, 2,2-dimethylol-1-phenyl-propanol, 3,3,3-trimethylol-isopropanol and 2,2,2-trimethylol-1-phenyl-ethanol, with an organic monohalide selected from the group consisting of allyl, methallyl, crotyl, β,γ-pentenyl, p,γ-hexenyl, β,γ-cyclopentenyl, and β,γ-cyclohexenyl, benzyl, and phenylbenzyl halide and an alkali metal hydroxide in the presence of a solvent consisting of a monohydroxy polyether selected from the group consisting of monohydroxy polyethers produced in situ and monohydroxy polyethers of said defined polyhydric alcohols, the temperature of said reaction being from about room temperature to about 200° C. and the amount of said halide and hydroxide present in said reaction mixture being at least that stoichiometrically required for etherifying all but one of said substituents of said polyhydric alcohol.

12. Process for the manufacture of monohydroxy trimethylolpropane-diallyl ether which comprises heating a mixture of trimethylolpropane, allyl chloride and sodium hydroxide in trimethylolpropane-diallyl ether as a solvent, the amounts of allyl chloride and sodium hydroxide being 10 percent excess of 2 mols to 1 mol of trimethylolpropane, at 60–70° C. under reflux, neutralising the mixture with an acid, washing with water, and fractionating the mixture.

13. Process for the manufacture of monohydroxy trimethylolpropane-dibenzyl ether which comprises heating a mixture of trimethylolpropane, benzyl chloride and sodium hydroxide, the amounts of benzyl chloride and sodium hydroxide being 10 percent excess of 2 mols to 1 mol of trimethylolpropane, at 60–70° C. under reflux, and isolating the ether.

14. Process for the manufacture of monohydroxy trimethylolpropane-dimethallyl ether which comprises heating a mixture of trimethylolpropane, methallyl chloride and sodium hydroxide in trimethylolpropane-dibenzyl ether as a solvent, the amounts of methallyl chloride and sodium hydroxide being 10 percent excess of 2 mols to 1 mol of trimethylolpropane, at 70–100° C. under reflux and isolating the ether.

15. Process for the manufacture of monohydroxy trimethylolpropane-monoallyl-monobenzyl ether which comprises heating a mixture of dihydroxy trimethylolpropane-monoallyl ether, benzyl chloride and sodium hydroxide, the amounts of benzyl chloride and sodium hydroxide being 5 percent excess of 1 mol to 1 mol of trimethylolpropane-monoallyl ether, at 80–100° C. under reflux and isolating the ether.

16. Process for the manufacture of monohydroxy pentaerythritol-triallyl ether which comprises heating pentaerythritol, allyl chloride and sodium hydroxide in pentaerythritol-triallyl ether as a solvent, the amounts of allyl chloride and sodium hydroxide being 40 percent excess of 3 mols to 1 mol of pentaerythritol, at 80–100° C. under reflux and isolating the ether.

References Cited in the file of this patent

UNITED STATES PATENTS

| | | |
|---|---|---|
| 1,774,500 | Burke | Sept. 2, 1930 |
| 2,838,572 | Rigterink | June 10, 1958 |